United States Patent [19]

Sigg

[11] Patent Number: 4,831,785
[45] Date of Patent: May 23, 1989

[54] WIRELESS ARRANGEMENT FOR CONTROLLING THE SPEED OF ADVANCE OF A TOOL TOWARD A WORKPIECE

[75] Inventor: Hans Sigg, Neuchâtel, Switzerland

[73] Assignee: Meseltron S.A., Corcelles, Switzerland

[21] Appl. No.: 89,370

[22] Filed: Aug. 26, 1987

[30] Foreign Application Priority Data

Sep. 1, 1986 [FR] France ............................. 86 12351

[51] Int. Cl.⁴ ............................................. B24B 49/00
[52] U.S. Cl. ................................ 51/165 R; 51/165.77; 51/165.93; 409/186; 409/193; 82/904
[58] Field of Search ........... 51/165 R, 165.77, 165.92, 51/165.93; 82/DIG. 9; 409/186, 193

[56] References Cited

U.S. PATENT DOCUMENTS

| | | | |
|---|---|---|---|
| 3,095,532 | 6/1963 | Floyd | 82/DIG. 9 |
| 3,550,327 | 12/1970 | Kusakabe et al. | 51/165.92 |
| 3,654,737 | 4/1972 | Schmidt | 51/165.92 X |
| 3,821,921 | 7/1974 | Rosenberg | 409/193 X |
| 4,145,816 | 3/1979 | Stobbe et al. | 33/174 L |
| 4,209,949 | 7/1980 | Staats et al. | 51/165.93 X |
| 4,400,118 | 8/1983 | Yamakage et al. | 409/127 X |
| 4,438,754 | 3/1984 | Nanny et al. | 51/169.92 X |
| 4,545,106 | 10/1985 | Juengel | 29/563 |
| 4,608,714 | 8/1986 | Juengel | 455/603 |
| 4,637,169 | 1/1987 | Sigg | 51/165.92 X |
| 4,657,451 | 4/1987 | Tanaka | 409/186 |

FOREIGN PATENT DOCUMENTS

| | | | |
|---|---|---|---|
| 2051680 | 4/1972 | Fed. Rep. of Germany | 51/165.92 |
| 2612981 | 10/1976 | Fed. Rep. of Germany | 51/165.77 |
| 2382310 | 9/1978 | France | 29/563 |
| 0135463 | 5/1979 | German Democratic Rep. | 409/186 |
| 0096772 | 6/1982 | Japan | 51/5 D |
| 60-06344 | 1/1985 | Japan | 51/165 R |
| 2126758 | 3/1984 | United Kingdom | 29/563 |

Primary Examiner—Frederick R. Schmidt
Assistant Examiner—Shirish Desai
Attorney, Agent, or Firm—Griffin, Branigan, & Butler

[57] ABSTRACT

A vibration sensor, located on a chuck member for a workpiece and rotating therewith, detects the signal emitted at the instant a tool member contacts the workpiece. The vibration sensor produces an output signal to modulate a transmitter and a receiver fastened to the machine tool frame receives the information broadcast by the transmitter. The information is processed to produce a signal which reduces the speed of a motor controlling the advance of the tool member. The speed of the tool member is thus reduced as soon as the tool member contacts the workpiece. The arrangement is particularly suited to machines for grinding interior diameters and prevents damage following accidental collision of the workpiece and tool member.

10 Claims, 2 Drawing Sheets

WIRELESS ARRANGEMENT FOR CONTROLLING THE SPEED OF ADVANCE OF A TOOL TOWARD A WORKPIECE

FIELD OF THE INVENTION

This invention concerns an arrangement for reducing the speed of advance of a tool member of a machine tool toward a workpiece as soon as said tool member has contacted said workpiece, the workpiece being driven in rotation by means of a carrier including a driving spindle and a chuck in which said workpiece is held, such arrangement comprising a vibration sensor adapted to detect a signal emitted at the instant of said contact, an electronic circuit for transmitting said signal and a motor responding to said circuit so as to regulate the speed of advance of said tool member.

BACKGROUND OF THE INVENTION

As a general rule the approach of a tool member towards the workpiece in machine tools is brought about with a relatively high speed in order to reduce as much as possible the dead time of the machine. However, when the tool member comes into contact with the workpiece, a very rapid reduction of this high advancing speed is desirable in order to avoid deterioration, as much to the tool member as to the workpiece.

Arrangements have long been known employed particularly in grinding machines, which include an acoustic sensor preferably of the piezo-electric type, intended to detect an acoustic emission which is generated when the grinding wheel touches the workpiece, the signal thus obtained being employed following amplification to reduce, if necessary to zero, the relatively high speed employed during the approach phase.

Such an arrangement may likewise be usefully employed to stop the machine in case of accidental collision between the tool member and the workpiece. A collision may be brought about for instance by a faulty setting of the workpiece which may bring about serious damage and injuries to the operator.

Such an arrangement is described for instance in the Swiss Pat. No. 585.609 where the sensor is fastened to the workpiece bearing headstock forming a part of the machine framework. Arrangements are likewise known where the sensor is fastened to the grinding wheel headstock.

At the same time such known arrangements present a difficulty in that the inherent noise generated by the tool when it comes into contact with the workpiece is scarcely different in intensity and frequency from the stray noises produced by the machine, for instance noises coming from the bearings, gears, pneumatic or hydraulic driving means, etc., to the extent that proper operation of the arrangement may not always be assured.

In the case where the sensor is fixed to the workpiece headstock, the useful signal, i.e. that which is produced when the grinding wheel comes into contact with the workpiece, must pass through bearings supporting the workpiece spindle before reaching the sensor, this representing a substantial resistance to the transmission of vibrations produced at the moment of contact. In the same manner, in cases where the sensor is fixed to the grinding wheel headstock, the useful noise must pass through bearings supporting the grinder spindle which in themselves, generate substantial vibrations due above all to the high rotation speed of the grinding wheel.

If, in certain specific cases of machining adapted above all to machines for machining exterior diameters of workpieces, the arrangements described hereinabove have proved most useful and operate to full satisfaction, the problem becomes more complex when it is one of grinding interior diameters of workpieces. In this latter case, in effect, the useful signal to be detected exhibits a greatly reduced amplitude due above all to the small dimensions of the grinding wheel as well as to the small force exerted by such grinding wheel against the workpiece. It will thus be difficult to obtain a sufficient distinction between the useful signal and the stray signal brought about by the machine, the first being often drowned in the second.

SUMMARY OF THE INVENTION

To avoid the difficulties cited hereinabove, this invention is characterized by the fact that the vibration sensor is fastened to the workpiece carrier and is driven therewith and in that the electronic transmission circuit includes a transmitter likewise fixed to the workpiece carrier which receives the signal coming from said sensor to broadcast information representative of said signal and a receiver placed at a station fixed to the machine framework and arranged so as to receive said information without any cabled connection.

The invention will be better understood with the help of the description to follow by way of example and with reference to the drawings herein.

DESCRIPTION OF THE PREFERRED EMBODIMENT

Figure 1:
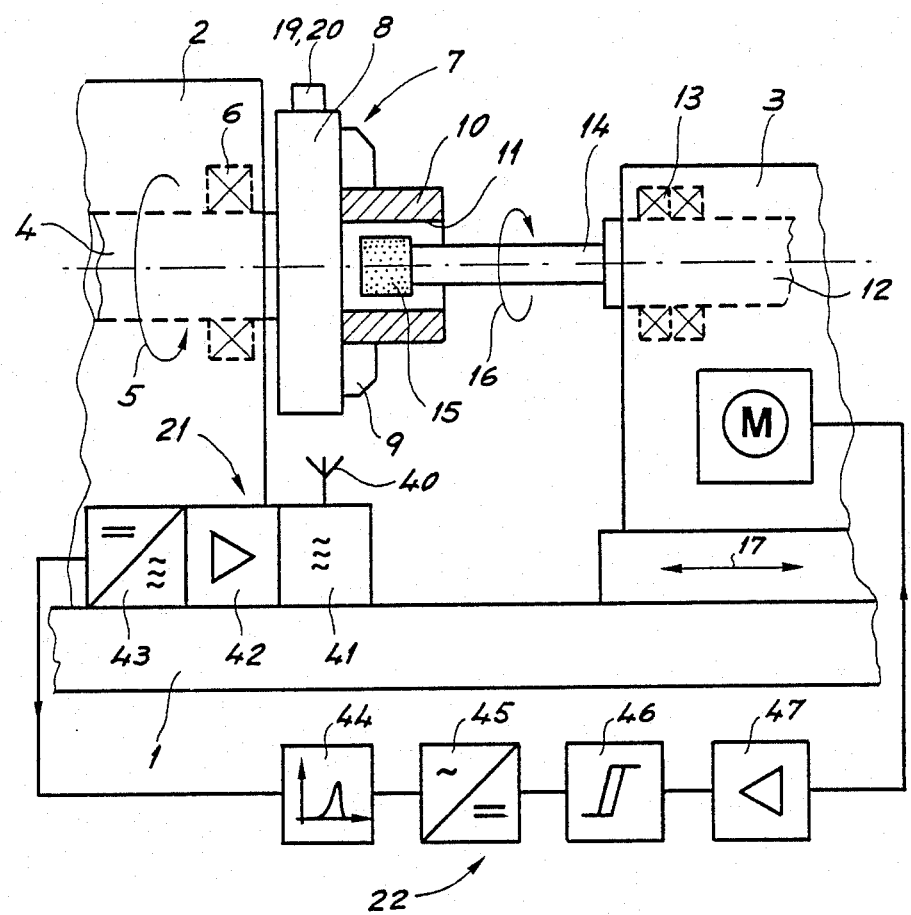
FIG. 1 shows schematically a grinding machine on which is mounted the arrangement in accordance with the invention and including a transmitter fixed to the chuck of the machine and a receiver placed so as to receive the signal coming from the transmitter and which controls the tool advance.

FIG. 1 is a simpified drawing of a grinding machine equipped with an arrangement according to the invention. This machine comprises a framework 1 on which rests a workpiece carrying headstock 2 and a grinding wheel headstock 3. The workpiece headstock comprises a spindle 4 for the workpiece which is driven in rotation in the sense of arrow 5 by a motor (not shown). Spindle 4 is mounted on the headstock 2 by bearings of which one-only 6 is shown on the drawing. At the end of spindle 4 is a securing member 7 including basically a chuck 8 with its bits 9. A workpiece 10 is fastened in the chuck 8. The workpiece 10 herein is shown in the form of a cylinder wherein the interior wall 11 is to be ground.

The grinding wheel headstock 3 comprises a spindle 12 supported by bearings of which one only 13 is shown on the drawing. An extension of the spindle 12 is fastened to a wheel bearing pin 14 at the end of which is found the wheel 15. The pin is driven in rotation at high speed in the sense of arrow 16 by a motor not shown. In addition to its normal rotation, the wheel is given an alternating movement in translation in the horizontal sense. Such movement is brought about by displacing the headstock 3 in the sense of arrow 17 by means of a motor (not shown). The pin 14 may also be displaced in a sense perpendicular to the drawing. This movement is controlled by motor M. Prior to the grinding operation, the wheel 15 is held at a good distance from the interior wall 11, then advances at high speed towards this wall. As soon as the wheel comes into contact with said wall, the advance speed is considerably reduced as has been set forth in the introduction to this description. According to the known state of the art this speed reduction is brought about either manually or automatically. In the first case, it is the machine operator who reduces the speed as soon as he notes sparks or hears the noise. In the second case, a slower speed may be given to the motor automatically before the contact, this however not without loss of time.

To avoid the difficulties set forth in the introduction, the present invention proposes fastening the vibration sensor 19 directly to the workpiece carrier and in particular to the securing member 7 of which the chuck 8 forms a part. As it is out of the question according to this arrangement to couple the sensor to motor M by means of a cabled connection, one makes use of a transmitter 20 arranged in proximity to the sensor 19 and adapted to broadcast information representing the signal furnished by the sensor, such signal being generated by the contact of the grinding wheel with the workpiece. Thus, sensor 19 and transmitter 20 are driven in rotation with chuck 8. FIG. 1 shows further that the arrangement includes a receiver 21 arranged at a position fastened to the machine framework, such receiver being arranged to receive the information emitted by transmitter 20. This information is then transmitted to the motor M via a signal processing circuit 22 as is well known from prior art.

The advantages brought about by the invention may be immediately appreciated: vibrations generated by the contacting of the tool with the workpiece follow a direct route between the source of the noise and the sensor without the necessity of passing through supports or bearings as would be the case if the sensor were fixed to the framework 1 of the machine or the workpiece carrying headstock 2. The invention likewise enables a measurement which is effected at almost immediate proximity to the noise source, this being most favourable and likewise helping to reject stray noises in a base noise of small amplitude.

As shown in FIG. 1, the sensor 19 and the transmitter 20 are attached to the chuck 8. Other arrangements would however be possible as for instance fastening the sensor and the transmitter onto the driving spindle 4. This arrangement would have the advantage of a more universal system since it would be designed once and for all on the inside of the workpiece carrier headstock 2. In this case the receiver 21 could also be placed at the interior of headstock 2.

The arrangement according to the invention, in addition to including a vibration sensor driven with the workpiece chuck, comprises thus an electronic circuit for transmitting the signal towards motor M which controls in its turn the advance of the pin 14 in the sense perpendicular to FIG. 1. It has been seen that this transmission circuit comprises a moving transmitter 20 and a fixed receiver 21. One may imagine several types of transmitters and receivers and the description to follow will describe several systems adapted to be employed without however attempting to set up an exhaustive inventory thereof.

Figure 2:
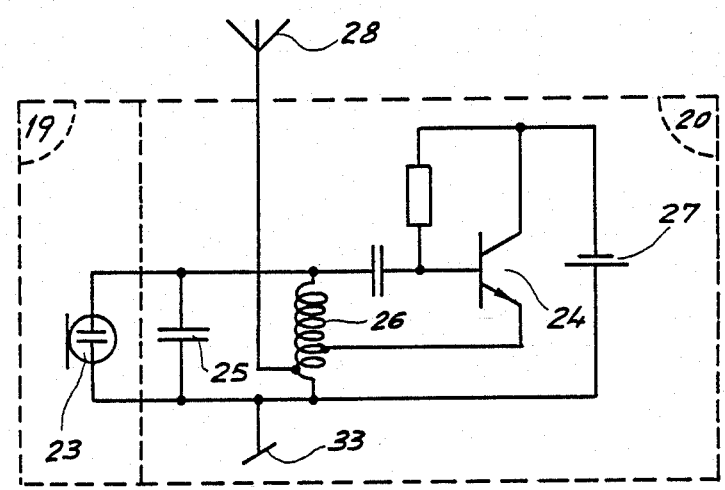
FIG. 2 shows in detail a possible realization of the transmitter shown on FIG. 1.

FIG. 2 shows a vibration sensor 19 coupled to an electro-magnetic radio wave transmitter 20. Sensor 19 includes a condenser microphone 23. Transmitter 20 comprises an oscillator formed by an npn transistor 24, capacitor 25 and self-inductance 26. It is energized by an autonomous energy source 27 (battery). The schematic as shown is that of a transmitter, the frequency of which is modulated by the condenser microphone 23. The transmitter radiates its energy by means of an antenna 28.

Figure 3:
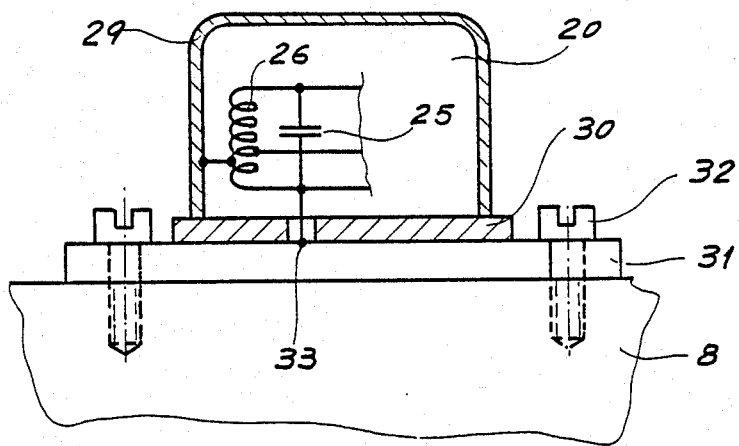
FIG. 3 shows a special embodiment of the antenna of the transmitter of FIG. 2.

FIG. 3 shows a special arrangement of the transmitter 20 which is encapsulated in a metallic casing 29 which serves as an antenna for the transmitter. In this case casing 29 is insulated from the chuck 8 by an insulating plate 30. The ground connection 33 of the transmitter circuit is obtained by a metallic base 31 fixed to chuck 8 by means of screws 32.

In the special case of FIG. 3, a vibration sensor in the strict sense of the term is not employed since the vibrations are directly detected by a capacitor 25 or a self-inductance 26 of special construction. Thus, capacitor 25 may be of a type referred to as microphonic as is the case of certain ceramic capacitors. Thereby, it provides a capacity which varies as a function of the vibrations to which it is subjected. In this manner it directly modulates the frequency of the oscillating circuit formed by said capacitor and the self-inductance 26. In the same manner, the self-inductance 26 may be of the type the inductivity of which varies as a function of the vibrations to which it is subjected. It could comprise a self-inductance with a magnetostrictive core, for instance. In this case it is the self-inductance which acts as a sensor and which directly modulates the frequency of the transmitter.

The examples mentioned hereinabove concern a transmitter which is frequency modulated. It is evident that other forms of modulation could be employed without departing from the objective of the invention. It is thus that one could likewise employ modulation of the amplitude or the phase, or yet by pulses. Pulse modulation responding to a binary code for instance could be applied in an infrared type transmission which will be subsequently discussed.

Figure 4:
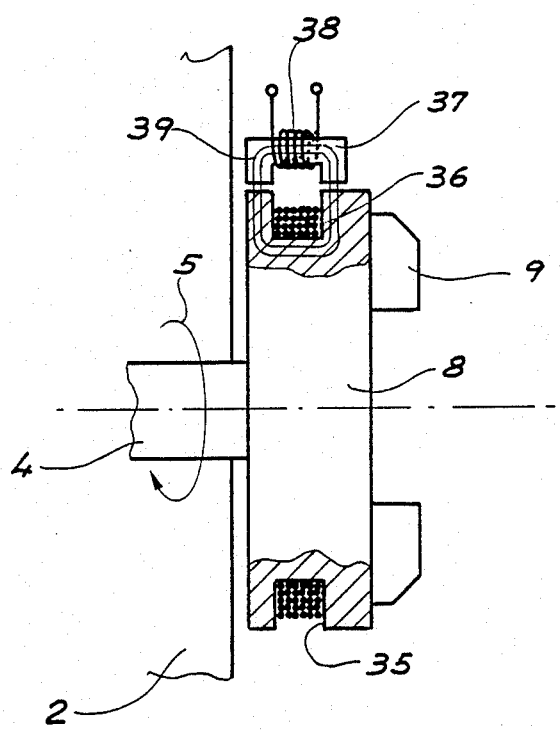
FIG. 4 shows a special form of coupling between the transmitter and the receiver shown on FIG. 1.

Another method of transmitting the signal provided by the vibration sensor is shown in FIG. 4. The chuck 8 includes a groove 35 in which is housed a primary winding 36. Such winding receives the signal emitted at the instant of contact of the grinder with the workpiece, this signal coming from a sensor and an amplifier housed in the chuck, but not shown on the drawing. At the periphery of the chuck 8 is located a fixed core 37 in the form of a U around which is wound a secondary fixed winding 38. The signal coming from the rotating winding 36 is transmitted to the fixed winding 38 by magnetic induction, here shown by the lines of force 39. The signal collected at the terminals of winding 38 is thereafter exploited to act on motor M of FIG. 1.

With respect to FIG. 4, it is interesting to note that the same arrangement may be employed for energizing the transmitter fixed to the chuck 8 and this in the manner of a transformer.

Another method of transmitting the signal generated by the sensor may be that employing light as carrier wave. This light may radiate in the visible or infra-red spectrum. Transmission by infra-red is greatly employed at present. A noteworthy example is that employed for controlling television receivers. In the application to the present invention an infra-red transmitter modulated by the vibration sensor is housed in the workpiece chuck and is arranged therein in a manner to be directly "seen" by a cell sensitive to such radiation and arranged at a fixed position on the framework of the machine. Since the chuck turns, several such infra-red transmitters will be placed on the periphery and arranged for instance in a manner as proposed by the Renishaw company for its measuring head of the type MP7. Thus one of such transmitters will always be directly in view of the receiver.

Some mention will now be made concerning the receiver equipping the arrangement according to the invention. In the case wherein the wave emitted by the receiver is an electro-magnetic radiowave, the receiver will be adapted to said wave and will be in the form shown on FIG. 1 and at reference 21. The receiver receives the information emitted by the transmitter from its antenna 40. The signal initially passes through a filter 41 tuned to the frequency emitted and amplified at 42, then demodulated at 43. It is to be noted that if frequency modulation is employed, the demodulator 43 is a frequency discriminator at the output of which is collected the useful signal generated by the contact of the grinding wheel with the workpiece. Such useful signal is thereafter processed by the electronic circuit 22 which includes a band-pass filter 44 tuned to the frequency of the signal, a rectifier 45 which transforms such signal into a DC signal and a comparator 46 which compares the DC signal to a reference signal. If the DC signal is greater than the reference signal, the comparator gives off in turn a control signal which excites a power circuit 47 which then assures the control of motor M and enables in particular reduction of the speed thereof. In itself the processing circuit is known from Swiss Pat. No. 585.609 cited hereinabove and motor M could be of the same type as that described likewise in this same patent.

It has already been mentioned why the arrangement as described is particularly suitable to machines for grinding interior diameters. It could however be extended to machines for grinding outer diameters as well.

What I claim is:

1. An arrangement for reducing the speed of advance of a tool member of a machine tool toward a workpiece as soon as said tool member has contacted said workpiece, the workpiece being driven in rotation by means of a carrier including a driving spindle and a chuck in which said work-piece is held, said arrangement comprising a vibration sensor adapted to detect a signal emitted at the instant of said contact and produce an output signal in response thereto, an electronic transmitting circuit for transmitting said signal, and a motor responsive to said electronic transmitting circuit for regulating the speed of advance of said tool member, said vibration sensor being fixed to said carrier and driven in rotation therewith, said electronic transmitting circuit including broadcasting means likewise fixed to said carrier and responsive to said output signal from said vibration sensor for radiating an electromagnetic information signal representative of said output signal and a receiver placed at a station fastened to the machine tool framework and arranged to receive said electromagnetic information signal in the absence of any cabled connection.

2. An arrangement as set forth in claim 1 wherein said vibration sensor and said broadcasting means are fixed to the chuck.

3. An arrangement as set forth in claim 1 wherein transmission of said information signal from said broadcasting means to said receiver is obtained through magnetic induction by means of coupling windings.

4. An arrangement as set forth in claim 1 wherein transmission of said information signal from said broadcasting means to said receiver is obtained by means of electromagnetic waves radiating in the visible or infrared spectrum.

5. An arrangement as set forth in claim 1 wherein transmission of said information signal from said broadcasting means to said receiver is obtained by means of electromagnetic radio waves.

6. An arrangement as set forth in claim 5 wherein said broadcasting means is encased in a metallic housing which serves as a broadcasting antenna for said electromagnetic radio waves.

7. An arrangement as set forth in claim 5 wherein said broadcasting means is frequency modulated by said output signal from said vibration sensor.

8. An arrangement as set forth in claim 7 wherein said vibration sensor is a capacitor sensitive to vibration arising from contact of said tool member with said workpiece, said capacitor being employed to modulate the frequency of said broadcasting means.

9. An arrangement as set forth in claim 7 wherein said vibration sensor is a condenser microphone sensitive to vibrations arising from contact of said tool member with said workpiece, said microphone being employed to modulate the frequency of said broadcasting means.

10. An arrangement as set forth in claim 7 wherein said vibration sensor is a self-inductance, the inductivity of which varies as a function of the vibrations arisng from contact of said tool member with said workpiece, said self-inductance being employed to modulate the frequency of said broadcasting means.

* * * * *